(12) United States Patent
Lantsov et al.

(10) Patent No.: US 10,296,776 B2
(45) Date of Patent: May 21, 2019

(54) DEVICE AND METHOD FOR BIOMETRICS AUTHENTICATION

(71) Applicant: SAMSUNG ELECTRONICS CO., LTD., Suwon-si (KR)

(72) Inventors: Alexey Dmitrievich Lantsov, Fizkulturnaya (RU); Alexey Andreevich Shchekin, Moscow (RU); Maksim Vladimirovich Riabko, Dolgoprudny (RU); Anton Sergeevich Medvedev, Maya (RU); Sergey Nikolaevich Koptyaev, N. Tagil (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 59 days.

(21) Appl. No.: 15/444,568

(22) Filed: Feb. 28, 2017

(65) Prior Publication Data

US 2017/0286741 A1 Oct. 5, 2017

(30) Foreign Application Priority Data

Mar. 31, 2016 (RU) ................................ 2016112118
Apr. 6, 2016 (KR) ........................ 10-2016-0042398

(51) Int. Cl.
*G06K 9/00* (2006.01)
*G06K 9/76* (2006.01)
*G06K 9/40* (2006.01)
*G06K 9/20* (2006.01)
(Continued)

(52) U.S. Cl.
CPC ....... *G06K 9/0004* (2013.01); *G06K 9/00087* (2013.01); *G06K 9/2054* (2013.01); *G06K 9/32* (2013.01); *G06K 9/52* (2013.01)

(58) Field of Classification Search
None
See application file for complete search history.

(56) References Cited

U.S. PATENT DOCUMENTS

| 5,854,697 A | 12/1998 | Caulfield et al. |
| 8,144,938 B2 | 3/2012 | Amano et al. |
| 8,199,244 B2 | 6/2012 | Baraniuk et al. |

(Continued)

OTHER PUBLICATIONS

Shahin et al. "Biometric Authentication Using Fast Correlation of Near Infrared Hand Vein Patterns", World Academy of Science, Engineering and Technology International Journal of Biomedical and Biological Engineering vol. 2, No. 1, 2008.*

(Continued)

*Primary Examiner* — Randolph I Chu
(74) *Attorney, Agent, or Firm* — Sughrue Mion, PLLC

(57) ABSTRACT

A biometrics authentication apparatus and a biometrics authentication method are disclosed. The biometrics authentication apparatus includes: a light source configured to emit a light; a modulator configured to change a spatial distribution of the light that is scattered and reflected from a region of interest of a user; a detector configured to detect an integral power of the light that is scattered from the region of interest; and a processor configured to obtain a measurement signal based on the integral power of the light, compare the measurement signal with a reference signal stored in a memory, and determine whether to authenticate the user based on a degree of match between the measurement signal and the reference signal.

15 Claims, 13 Drawing Sheets

(51) Int. Cl.
    *G06K 9/52*     (2006.01)
    *G06K 9/32*     (2006.01)

(56) References Cited

U.S. PATENT DOCUMENTS

2014/0294251 A1   10/2014   Jo et al.
2015/0161461 A1   6/2015    McNulty et al.
2015/0180866 A1   6/2015    Hama
2018/0203882 A1*  7/2018    Hilsdale ................. G16H 40/20

OTHER PUBLICATIONS

R. Rox Anderson et al., "The Optics of Human Skin", The Journal of Investigative Dermatology, vol. 77, No. 1, 1981, pp. 13-19 (Total 8 pages).
Emmanuel Candes et al., "Stable Signal Recovery from Incomplete and Inaccurate Measurements", Submitted to Communications on Pure and Applied Mathematics, Mar. 2005, Total 15 pages.
Michael Elad, "Sparse and Redundant Representation Modeling—What Next?", IEEE, Springer, 2010, Total 8 pages.
Roger A. Horn and Charles R. Johnson, "Norms for Vectors and Matrices", Matrix Analysis, Second Edition, Cambridge, England, Cambridge University Press, 1990, Total 18 pages.

* cited by examiner

DEVICE AND METHOD FOR BIOMETRICS AUTHENTICATION

CROSS-REFERENCE TO RELATED APPLICATIONS

This application claims priority from Korean Patent Application No. 10-2016-0042398, filed on Apr. 6, 2016 in the Korean Intellectual Property Office, and Russian Patent Application No. 2016112118, filed on Mar. 31, 2016 in the Russian Federal Service for Intellectual Property, the disclosures of which are incorporated herein by reference in their entireties.

BACKGROUND

1. Field

Apparatuses and methods consistent with exemplary embodiments relate to a biometrics authentication, and more particularly, to authenticating a user based on a vein pattern of the user.

2. Description of the Related Art

User authentication may be performed in various manners based on biometric information, for example, fingerprints, an iris, a retina pattern, and patterns of veins of a palm and a wrist. When a user uses a watch, a health-care device, or a wearable device for tracking activities of the user, it is important to provide the user with a personal authentication device. A wrist of the user may be suitable for obtaining biometric information. That is, use of a vein pattern authentication solution is highly recommended. There are various solutions for performing authentication processes based on information about a pattern of a vein. For example, devices for registering and processing an image showing a pattern of a vein or devices for registering and processing signals related to the pattern of the vein may be used to perform the authentication processes. The former devices operate by using the image showing the pattern of the vein. However, information about the pattern of the vein of the user may be stolen. The latter devices are more reliable than the former devices, but when the devices are not exactly located on the wrist of the user, the accuracy of the devices may degrade, and thus authentication errors may occur.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a biometrics authentication method and a biometrics authentication apparatus using a pattern of a vein and having improved security and safety during biometrics authentication.

According to an aspect of an exemplary embodiment, there is provided a biometrics authentication apparatus including: a light source configured to emit a light; a modulator configured to change a spatial distribution of the light that is scattered and reflected from a region of interest of a user; a detector configured to detect an integral power of the light that is scattered from the region of interest; and a processor configured to obtain a measurement signal based on the integral power of the light, compare the measurement signal with a reference signal stored in a memory, and determine whether to authenticate the user based on a degree of match between the measurement signal and the reference signal.

The modulator may include a 2-dimensional (2D) binary mask including a block area in which light is blocked and a pass area in which light passes, and the detector may be further configured to detect the integral power of the light as respective values with regard to the 2D binary mask that is formed at temporal intervals according to sequence control of the modulator.

The modulator may be further configured to operate based on a spatial distribution of an amplitude transmission function to generate a 2-dimensional (2D) binary mask including a block area in which light is blocked and a pass area in which light passes, and the processor may be further configured to control the modulator to change the spatial distribution of the light through the 2D binary mask.

The processor may be further configured to determine whether to authenticate the user based on a correlation value used to determine the degree of match between the measurement signal and the reference signal.

The processor may be further configured to determine that the user has been authenticated when a correlation value between the measurement signal and the reference signal is greater than or equal to 0.95.

The degree of match may be represented by a correlation value between the measurement signal and the reference signal, and the processor may be further configured to perform an authentication process until the correlation value becomes greater than or equal to a predetermined value by repeating a shift of a 2-dimensional (2D) binary mask of the modulator to correct misalignment of the biometrics authentication apparatus.

The predetermined value may be greater than or equal to 0.95.

The processor may be further configured to obtain a matrix including the correlation value by repeating the shift of the 2D binary mask along at least one of an x axis and a y axis of the 2D binary mask.

The light emitted from the light source may include near infrared light having a wavelength ranging from about 750 nm to about 950 nm.

The biometrics authentication apparatus may include a wearable device configured to be worn on a wrist of the user.

According to an aspect of another exemplary embodiment, there is provided a biometrics authentication method including: emitting a light onto a region of interest of a user; changing a spatial distribution of the light that is scattered from the region of interest; detecting an integral power of the light that is scattered from the region of interest; obtaining a measurement signal based on the integral power of the light; comparing the measurement signal with a reference signal; and determining whether to authenticate the user based on a degree of match between the measurement signal and the reference signal.

The changing the spatial distribution of the light may include changing the spatial distribution of the light based on a 2-dimensional (2D) binary mask including a block area in which light is blocked and a pass area in which light passes, and the detecting of the integral power of the light may include detecting the integral power of the light as respective values with regard to the 2D binary mask.

The changing the spatial distribution of the light may further include changing the 2D binary mask to generate the 2D binary mask at a temporal interval.

The determining whether to authenticate the user may include determining whether to authenticate the user based on a correlation value used to determine the degree of match between the measurement signal and the reference signal.

The determining whether to authenticate the user may include determining that the user has been authenticated when the correlation value is greater than equal to 0.95.

The degree of match may be represented by a correlation value between the measurement signal and the reference signal, and the method may further include, while a shift of the 2D binary mask is repeatedly performed, performing an authentication process until the correlation value becomes greater than or equal to a predetermined value to correct misalignment of a biometrics authentication apparatus that performs the biometrics authentication method.

The predetermined value may be greater than or equal to 0.95.

The performing the authentication process may include obtaining a matrix including the correlation value while the shift of the 2D binary mask is repeatedly performed along at least one of an x axis and a y axis of the 2D binary mask.

The emitted light may include near infrared light having a wavelength ranging from about 750 nm to about 950 nm.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
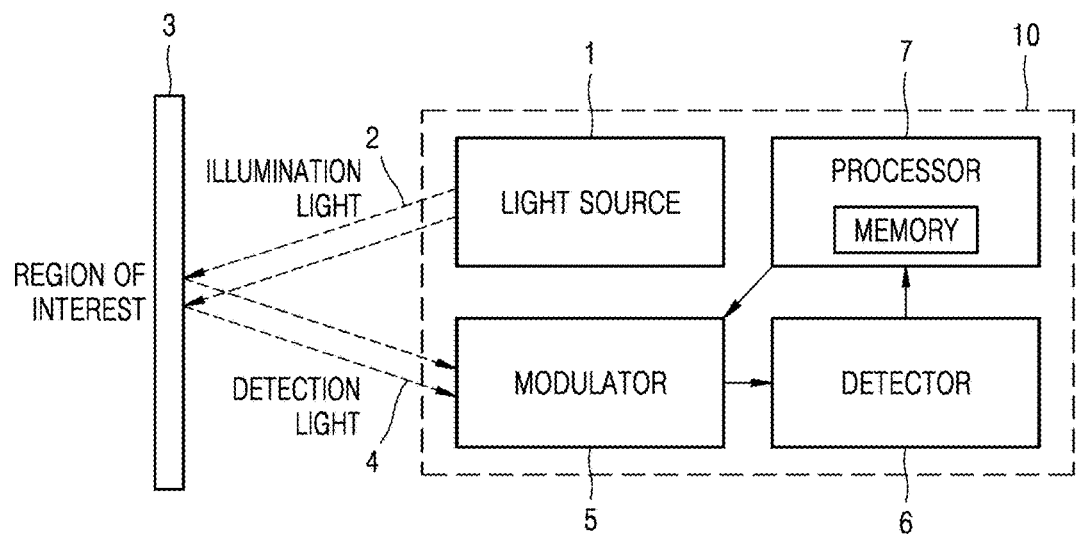
FIG. 1 is a schematic block diagram of a biometrics authentication apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Figure 2:
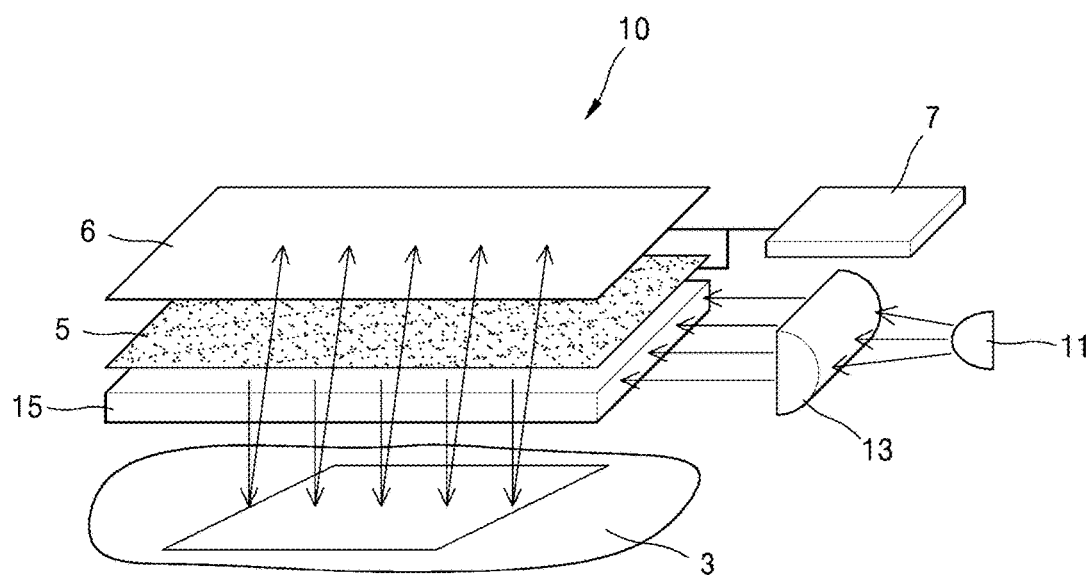
FIG. 2 is a schematic perspective view of a structure of a biometrics authentication apparatus according to an exemplary embodiment.

FIG. 1 is a schematic block diagram of a biometrics authentication apparatus 10 according to an exemplary embodiment. FIG. 2 is a schematic perspective view of a structure of the biometrics authentication apparatus 10 according to an exemplary embodiment.

Referring to FIGS. 1 and 2, the biometrics authentication apparatus 10 includes a light source 1 that emits an illumination light 2, a modulator 5, a detector 6, and a processor 7. The biometrics authentication apparatus 10 may further include a display that displays an authentication result.

The light source 1 may provide the illumination light 2 that is either coherent or incoherent and has a wavelength selected to penetrate tissues of a human body as deeply as possible. For example, the light source 1 may provide a near infrared light ranging from about 750 nm to about 950 nm as the illumination light 2.

As shown in FIG. 2, the light source 1 is an illuminator and may include, for example, a light source 11 that generates the illumination light 2, a cylindrical lens 13 that concentrates the illumination light 2 emitted from the light source 11, and a front light guide 15 that guides the illumination light 2 that is concentrated by the cylindrical lens 13 and is incident to a side surface of the front light guide 15 and emits the guided illumination light 2 onto a region of interest 3 of a human body. The light source 11 may emit the illumination light 2 that is either coherent or incoherent and has a wavelength selected to penetrate the tissues of the human body as deeply as possible. In this case, the illumination light 2 may be the near infrared light ranging from about 750 nm to about 950 nm. The light source 11 may emit one or more illumination lights 2 that have different wavelengths illuminating the region of interest 3 of the human body. For example, the light source 11 may be configured to emit an illumination light having a single wavelength, may include a plurality of light sources emitting illumination lights having different wavelengths, or may be a single light source emitting illumination lights having different wavelengths. The illumination light 2 may be concentrated by the cylindrical lens 13, sufficiently pressed to fit into the biometrics authentication apparatus 10, for example, a form factor of a wearable device, and focused on the side surface of the front light guide 15. The front light guide 15 may uniformly illuminate the region of interest 3, for example, a skin surface of the wrist.

The region of interest 3 of the human body may be a body part including a pattern of a vein. For example, the region of interest 3 may correspond to a pattern of a vein of a wrist. For example, when the illumination light 2 is emitted onto the wrist, the illumination light 2 that penetrates the wrist may be scattered first by red blood cells (RBCs) in blood vessels and then may be reflected at a high intensity where a contrast image of the pattern of the vein of the wrist may be obtained. That is, the illumination light 2 penetrates tissues and then is reflected and scattered back. A reflective light that is scattered from the region of interest 3, reflected backwards, and propagated backwards from the skin surface corresponds to a detection light 4 in the present exemplary embodiment. The detection light 4 is propagated through the modulator 5 that is sequentially controlled based on a signal transmitted from the processor 7. User authentication using the pattern of the vein of the wrist will be described. However, patterns of veins at other body parts besides the wrist may be used as well if the patterns indicate unique characteristics of the user. For example, the biometrics authentication apparatus 10 may be embodied as a wearable device worn on the wrist and may be used to use the pattern of the vein of the back of a hand of the user for user authentication by changing locations of the light source 1 and the detector 6.

According to parameters of the light source 1, for example, a light source that emits the illumination light 2 having different wavelengths, the detection light having different wavelength components may produce spatial masks and may be propagated by the modulator 5 that modulates a spatial intensity distribution of a propagation light as a signal from the processor 7 is controlled.

Figure 3:
FIG. 3 shows an example of a 2-dimensional (2D) binary mask.

The modulator 5 changes a spatial distribution of the detection light 4 that is scattered from the region of interest 3 and is propagated according to sequence control. As shown in FIG. 3, the modulator 5 may include 2D binary masks of a block area where light is blocked and a pass area where the light passes and may switch the 2D binary masks according to control a signal transmitted from the processor 7. FIG. 3 shows an example of the 2D binary mask. In the 2D binary mask of FIG. 3, the block area may correspond to a black area and the pass area may correspond to a white area.

The 2D binary masks of the modulator 5 modulate the detection light 4 by changing optical parameters, for example, the spatial distribution such as an amplitude and a phase, through propagation of the detection light 4. Total power of the modulated detection light 4 that is output by the modulator 5 may be registered by the detector 6.

The modulator 5 may be formed as the 2D binary masks and may change the spatial distribution of the detection light 4 that is scattered from the region of interest 3 and is propagated. Also, in the modulator 5, the 2D binary masks may be formed at temporal intervals according to the sequence control.

The modulator 5 may include, for example, a liquid crystal display (LCD), which forms 2D binary pixel masks of the block area and the pass area and is controlled by a sequence of the signal transmitted from the processor 7. When the modulator 5 includes an LCD, the LCD may operate and may be switched in such a manner that black and white pixels form the 2D binary pixel masks according to the signal transmitted from the processor 7 in sequence. The LCD may be switched in a state in which a spatial amplitude function of light penetration indicates the 2D binary pixel masks such that the black pixel of the LCD forms the block area corresponding to zero light penetration and the white pixel thereof forms the pass area corresponding to full light penetration. Total output power of the light that is propagated through the LCD having a binary light penetration function may be registered by the detector 6 in such a manner that one light detector has one value of each 2D binary mask formed by the LCD.

As another example, the modulator 5 may include a diffusion scatterer having a spatial distribution of an amplitude transmission function in order to form the 2D binary masks of the block area and the pass area. In this case, the modulator 5 may have periodic light penetration characteristics. In this case, the 2D binary masks formed by the modulator 5 may be switched to operation manually by using spring constants of the modulator 5 without a receiving signal from the processor 7, for example, when the modulator 5 is of a thin-film type. Since the modulator 5 may be manufactured to make the biometrics authentication apparatus 10 have unique and arbitrary light penetration characteristics, the security of the biometrics authentication apparatus 10 may be high.

The detector 6 detects an integral power of the detection light 4 that is scattered from the region of interest 3 of the human body and propagated through the modulator 5. The integral power of the detection light 4 propagated through the modulator 5 is registered as respective values in the detector 6 with regard to the 2D binary masks that are formed at temporal intervals according to the sequence control of the modulator 5.

To this end, the detector 6 may include a light detector including a single light receiving area or a plurality of light receiving areas. When the detector 6 includes the light detector including the light receiving areas, a result of detecting the integral power may correspond to a sum of detection signals in the light receiving areas.

The processor 7 obtains a measurement signal by processing a signal that is obtained by the detector 6 according to the sequence control of the modulator 5, compares the measurement signal with a reference signal stored in a memory, and determines whether to authenticate the user according to a degree of match between the measurement signal and the reference signal. The reference signal is a signal for identifying an owner of the biometrics authentication apparatus 10 and may be set when the biometrics authentication apparatus 10 is initially used. As described below, the reference signal may be set when the biometrics authentication apparatus 10 is initially corrected.

The processor 7 may use a correlation value to determine the degree of match between the measurement signal and the reference signal, and when the correlation value is equal to or greater than a certain value, it may be determined that the user has been authenticated. For example, the processor 7 may determine that the user has been authenticated when a correlation value between the reference signal and the measurement signal is, for example, equal to or greater than 0.95. Data of a detection signal detected by the detector 6 may be stored in a memory of the processor 7 in order to perform authentication processes.

Figure 4:
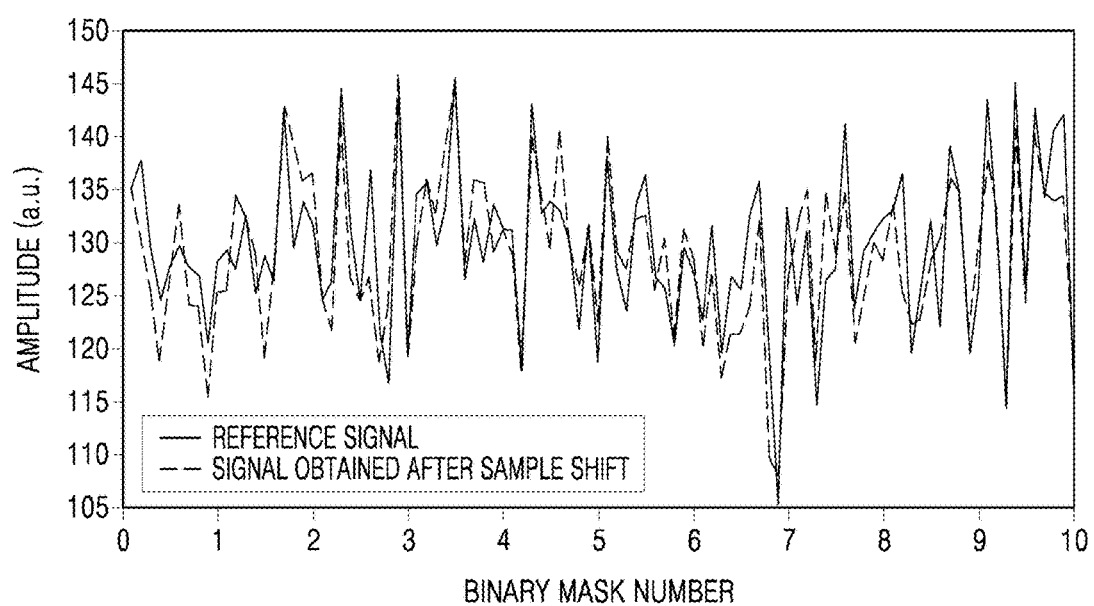
FIG. 4 shows a dependence of entire output power registered by a detector with regard to the number of 2D binary masks generated by a modulator.

All signals that are registered by the detector 6 in one registration cycle may be similar to the reference signals shown in FIG. 4. FIG. 4 shows a dependence of the total output power that is registered by the detector 6 with regard to the number of 2D binary masks generated by the modulator 5.

Whenever the user authentication is required, a process of measuring the dependence of the total output power that is registered by the detector 6 with regard to the number of 2D binary masks may be performed. The user authentication itself is performed by comparing the reference signal stored in the memory of the biometrics authentication apparatus 10 with the measurement signal detected as the integral power by the detector 6. As described above, the correlation value may be used to determine how much the reference signal match with the measurement signal. For example, when the correlation value is, for example, equal to or greater than 0.95, it may be considered that the user has been authenticated.

Since an actual image showing the pattern of the vein of the user is not stored in the memory, there is not risk that data regarding the image showing the pattern of the vein is leaked. Accordingly, another user may not access the data regarding the image showing the pattern of the vein of the user by using the biometrics authentication apparatus 10, for example, a wearable device, without permission.

When being worn on the wrist, the biometrics authentication apparatus 10 may correct a possibility of misalignment.

Figure 5:
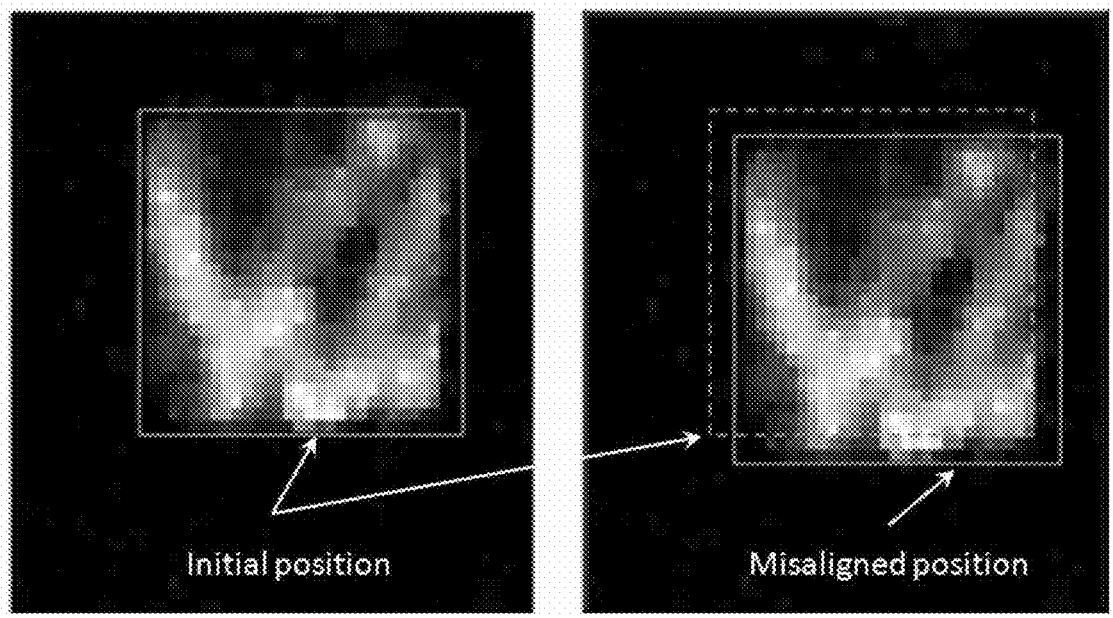
FIG. 5 shows images of patterns of veins at an initial position and a misaligned position.

For example, a case where the biometrics authentication apparatus 10 is embodied as a wearable device worn on the wrist of the user is considered. It is assumed that the biometrics authentication apparatus 10 is worn on the wrist at a position that is not exactly the same as a previous position. In this case, a precise pattern structure may be shifted as shown in FIG. 5. An initial position is shown on the left side of FIG. 5, and a misaligned position is shown on the right side of FIG. 5. Misalignment of the pattern of the vein changes the detection signal registered by the detector 6. When a misalignment value is small, the measurement signal may change with respect to the reference signal, similar to a signal obtained after sample shift shown as a dashed line in FIG. 4. However, since the misalignment value is small, both the measurement signal and the reference signal may be highly correlated (e.g., the correlation value is equal to or greater than 0.95), and in this case, the user authentication may be considered as being positive.

On the contrary, the misalignment value may be much higher, and in this case, the measurement signal and the reference signal may not be correlated. In order to prevent impossibility of authentication that results from the misalignment, a spatial distribution of black pixels of each 2D binary mask that is formed by the modulator 5 in a full sequence may be slightly shifted, as shown in FIG. 6.

Figure 6:
FIG. 6 shows a shift of 2D binary masks formed by a modulator.

FIG. 6 shows a shift of the 2D binary masks formed by the modulator 5. A 2D binary mask of a reference matrix is shown on the left side of FIG. 6, and a 2D binary mask of a shifted matrix is shown on the right side of FIG. 6.

When the modulator 5 includes an LCD, a spatial distribution of black pixels is slightly shifted, and then the shifted spatial distribution may be displayed on the LCD. In the entire sequence, a process of shifting the 2D binary masks may be repeatedly performed based on different values and directions.

As shown in FIG. 6, along at least one of an x-axis direction and a y-axis direction, a dependence of correlation values between reference signals and measurement signals, which are obtained by shifting different 2D binary masks, is obtained. The dependence may be expressed as a function of two variables that are shifted along an x axis, a y axis, or a matrix and may be visualized as a 2D plot of FIG. 7.

Figure 7:
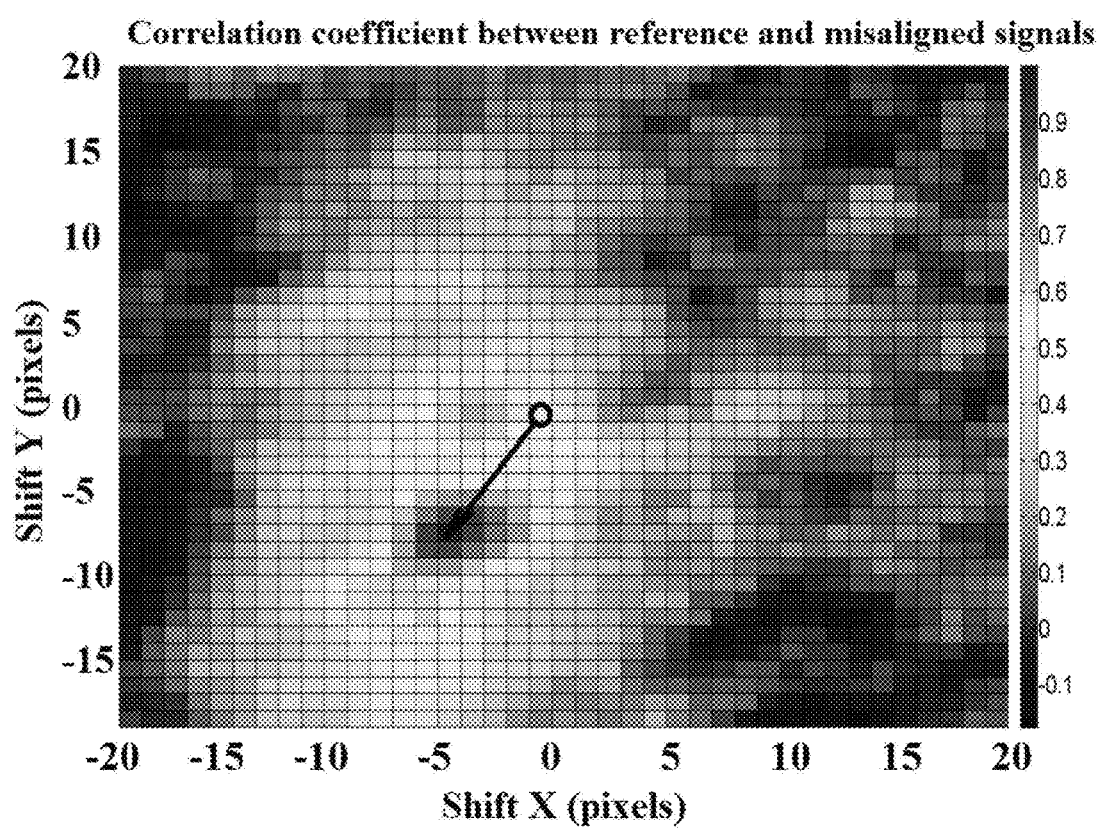
FIG. 7 is a 2D plot that visualizes a correlation value of a reference signal and a misaligned signal according to a shift of a 2D binary mask.

FIG. 7 is a 2D plot that visualizes correlation values of a reference signal and a misaligned signal according to a shift of a 2D binary mask. Referring to FIG. 7, a maximum value of the correlation values relatively reaches coordinates (−5, −8) with respect to a central point (0, 0) of a coordinate plot. A length of a black arrow is in proportion to a shift value, and a direction of the black arrow corresponds to a shift direction.

Therefore, in order to compensate for misalignment that may occur while the authentication process is performed, a matrix including values of the correlation values between the reference signals and the measurement signals is obtained, and whether the values of the correlation values included in the matrix are greater than certain values, for example, equal to or greater than 0.95, is checked. When the values of the correlation values are, for example, equal to or greater than 0.95, the process of authenticating the user is considered as being positive, and thus user authentication during which the misalignment is compensated for may be completed.

Another method of processing misalignment errors includes reconstructing an actual image showing a pattern of a vein of a wrist so as to obtain numerical data regarding a misalignment direction and value of the biometrics authentication apparatus 10. The actual image showing the pattern of the vein may be reconstructed by the processor 7 by controlling the modulator 5.

Figure 8:
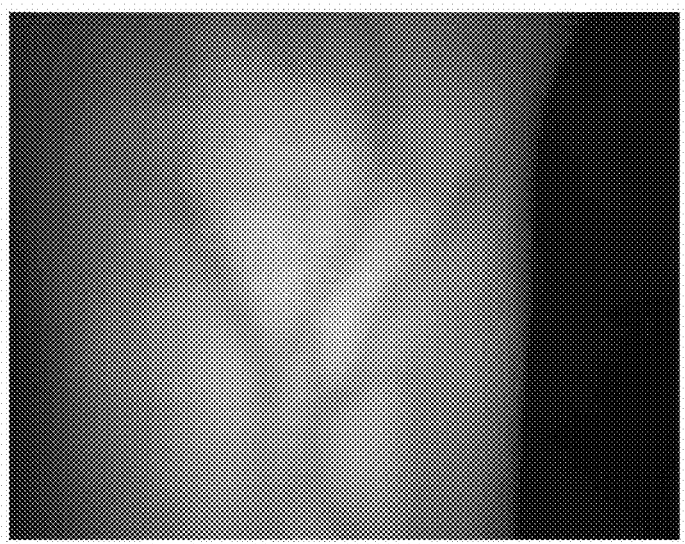
FIG. 8 is an image of a pattern of a vein which is to be restructured.
Figure 9:
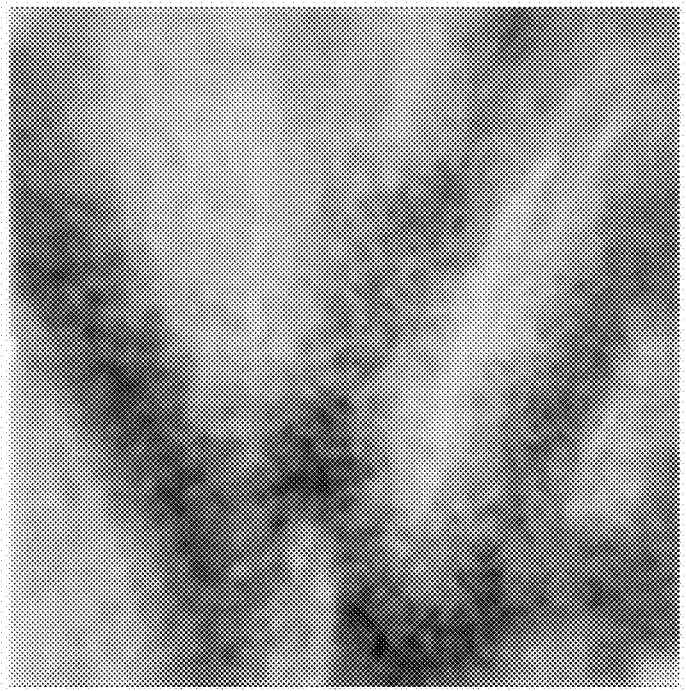
FIG. 9 is an enlarged image of a pattern of a vein.
Figure 10:
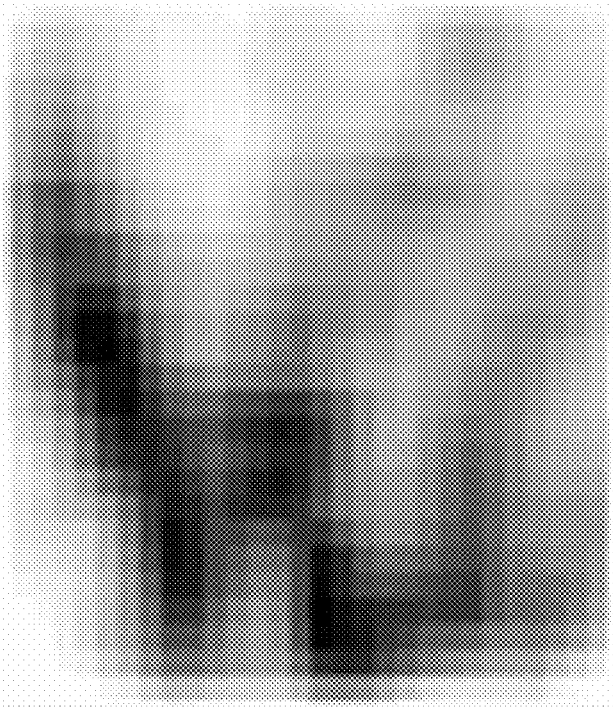
FIG. 10 is an image of a pattern of a vein which is restructured by a biometrics authentication apparatus according to an exemplary embodiment.

The numerical data regarding the misalignment direction and value may be required to correctly and repeatedly align the biometrics authentication apparatus 10. The reconstruction of the image may be performed by using a sequence b(t) that is measured by the detector 6, and a solution of the reconstruction is shown in Equation 1.

$$\min\|x_1\| \text{ subject to } Ax=b \quad \text{[Equation 1]}$$

where, x is a vector indicating a spatial distribution of light in a plane of the modulator 5, $\|x_1\|$ is L1-norm of vector x, and A indicates a matrix of values of binary masks formed by the modulator 5. FIG. 8 is an image of a pattern of a vein which is to be restructured, and FIG. 9 is an enlarged image of the pattern of the vein. A result of reconstructing the pattern of the vein by using the biometrics authentication apparatus 10 is shown in FIG. 10. It is found that the reconstructed image shows all of the characteristics shown in an original image and is used to authenticate the pattern of the vein.

According to the biometrics authentication apparatus 10, when the detection light 4 is changed by the modulator 5 including the 2D binary masks, the image of the pattern of the vein may be reconstructed. In order to make the reconstructed image show the characteristics of the pattern of the vein, a wearing state of the biometrics authentication apparatus 10 is adjusted to correct the misalignment, and then the user authentication may be performed.

Before the user uses the biometrics authentication apparatus 10 for the first time, the user needs to initially correct the biometrics authentication apparatus 10, that is, store their biometric data in a memory of the biometrics authentication apparatus 10. In order to store the biometric data, the following processes may be performed. For example, the user places the biometrics authentication apparatus 10 on the wrist with a hand of the user. After the biometrics authentication apparatus 10 is turned on, the light source 1 emits the illumination light 2 for illuminating the skin of the user, and as the illumination light 2 is emitted onto the region of interest 3, for example, a portion where the pattern of the vein is located, the detection light 4 is scattered from the region of interest 3 and is propagated backwards. The detection light 4 that is scattered and propagated is transmitted through the modulator 5 that generates the 2D binary masks according to the sequence control of the processor 7. It may be assumed that it takes about, for example, 1 second, for the modulator 5 to generate a full set of the 2D binary masks. The integral power of the detection light 4 that passes through the modulator 5 and is modulated is registered by the detector 6. An output signal that is transmitted from the detector 6 at this time is considered as one of the above-described reference signals and is stored in the memory of the processor 7. As a result, initial correction of the biometrics authentication apparatus 10 is completed.

A signal that is obtained during the initial correction is a reference signal. When the biometrics authentication apparatus 10 is actually used, the reference signal is compared with a measurement signal.

In the case of biometrics authentication using a pattern of a vein of the user, the above-described processes are repeated. In this case, the measurement signal is compared with the reference signal stored in the memory of the processor 7. When a degree of match between the measurement signal and the reference signal is high, for example, when the correlation value of the measurement signal and the reference signal is equal to or greater than 0.95, the authentication process is completed, and thus the user may have been authenticated. Accordingly, an owner of the biometrics authentication apparatus 10, for example, a wearable device including the biometrics authentication apparatus 10 according to an exemplary embodiment, is identified, all functions of the biometrics authentication apparatus 10 may be properly performed without being blocked. When the user authentication is successfully performed, the user may receive audio or visual signals via an audio device or a display that is additionally included in the biometrics authentication apparatus 10. When the audio or visual signals are not properly received, the biometrics authentication apparatus 10 may remain blocked.

Figure 11:
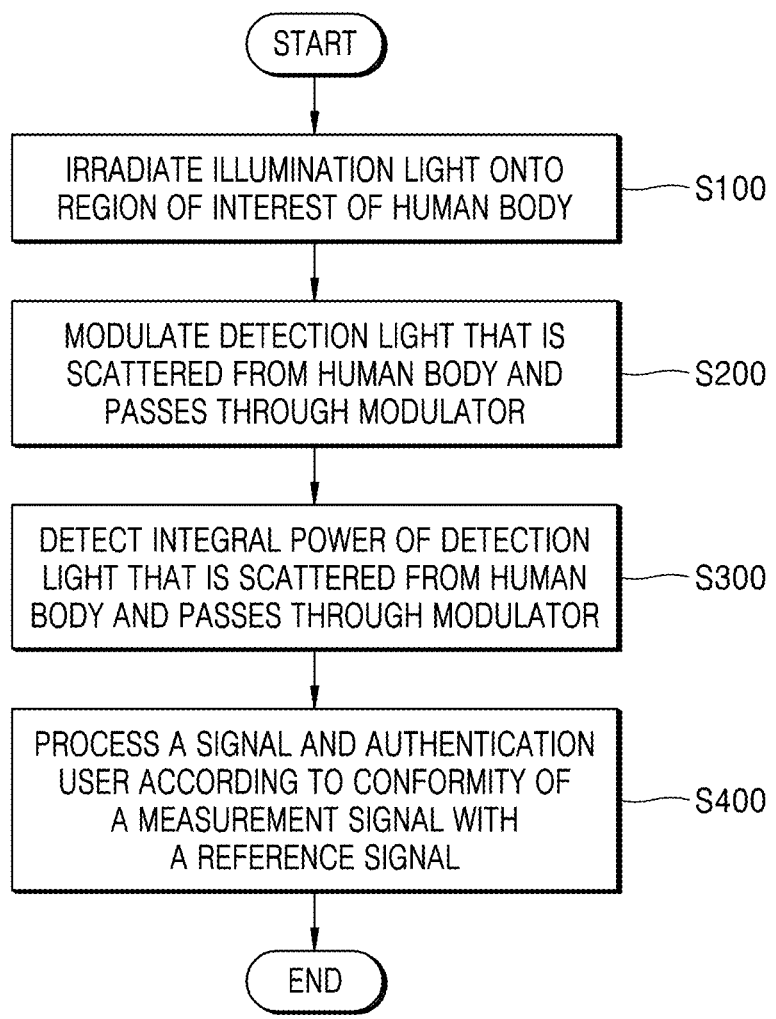
FIG. 11 is a schematic flowchart of a biometrics authentication process according to an exemplary embodiment.

FIG. 11 is a schematic flowchart of a biometrics authentication process according to an exemplary embodiment.

Referring to FIG. 11, the illumination light 2 is emitted onto the region of interest 3 of the human body, for example, the wrist, in operation S100. When the illumination light 2 is emitted, the detection light 4 that is scattered and reflected from the region of interest 3 is generated, and a spatial distribution of the detection light 4 provides data regarding the pattern of the vein in an illuminated area. In operation S200, the detection light 4 is transmitted through the modulator 5 that generates and modulates a set of 2D binary masks that are sequentially switched according to sequence control. In operation S300, an integral power of the detection light 4 that is scattered from the human body and passes through the modulator 5 is detected by the detector 6. In this case, with regard to each 2D binary mask formed by the modulator 5, all signals regarding one sample are registered by the detector 6 as the integral power. A detection signal registered by the detector 6 as the integral power is processed into an actual measurement signal by the processor 7, and the measurement signal is stored in the memory as data. Also, the measurement signal is compared with a reference signal stored in the memory in operation S400. When a degree of match between the measurement signal and the reference signal is high (e.g., the degree of match is greater than a threshold value), the authentication process is considered to be positive, that is, the user is considered to have been authenticated.

According to the biometrics authentication apparatus 10 and the biometrics authentication method, in order to compensate for misalignment of the biometrics authentication apparatus 10 on the wrist, an operation of switching the 2D binary masks that are formed by the modulator 5 according to the control of the processor 7 is performed. Also, user authentication may be stably performed without storing an actual image of the pattern of the vein in the memory of the biometrics authentication apparatus 10.

As described above, the biometrics authentication apparatus 10 according to an exemplary embodiment may be realized as a wearable device worn on the wrist.

Figure 12:
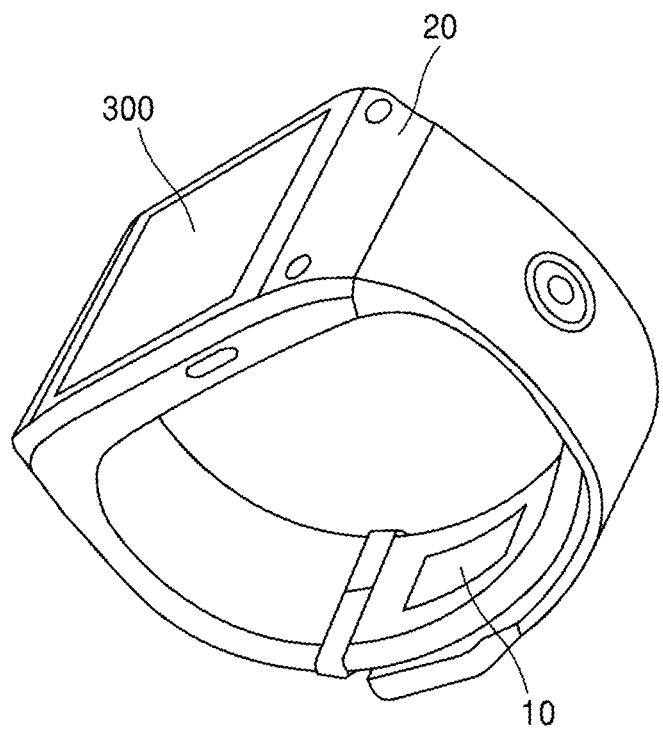
FIG. 12 shows an example in which a biometrics authentication apparatus according to an exemplary embodiment is embodied as a watch-type wearable device.
Figure 13:
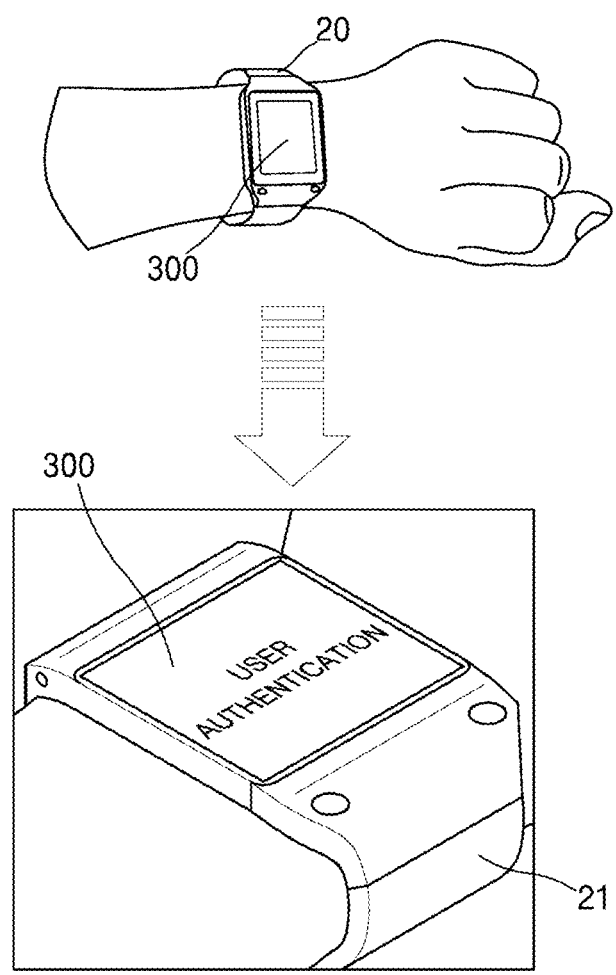
FIG. 13 shows an example of a state in which the biometrics authentication apparatus of FIG. 12 is used.

FIG. 12 shows an exemplary example in which the biometrics authentication apparatus 10 according to an exemplary embodiment is embodied as a watch-type wearable device. FIG. 13 shows an example of a state in which the biometrics authentication apparatus 10 of FIG. 12 is used.

Referring to FIGS. 12 and 13, when the user properly wears the biometrics authentication apparatus 10, the light source 1 and the detector 6 of the biometrics authentication apparatus 10 may be located on straps 20 corresponding to portions where the patterns of veins of the wrist are located. When the illumination light 2 is emitted onto the patterns of the veins from the light source 1, the spatial distribution of the detection light 4 that is scattered and reflected from the patterns of the veins is modulated by the modulator 5 according to the sequence control, the measurement signal is obtained by processing the signal that is obtained by detecting the integral power by the detector 6, and whether to authenticate the user may be determined according to the degree of match between the measurement signal and the reference signal, for example, the correlation value.

User authentication information generated by the processor 7 may be displayed on a screen of a display unit 300 of the wearable device worn on the wrist of the user.

Figure 14:
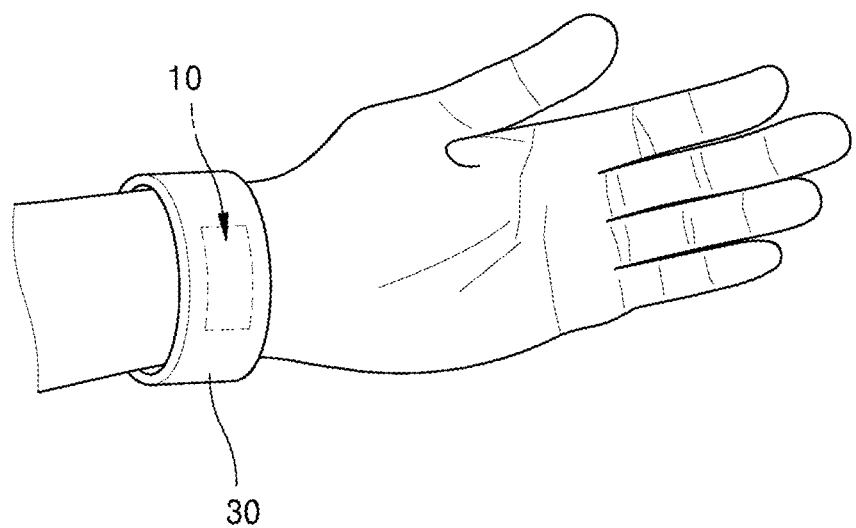
FIG. 14 shows an example in which a biometrics authentication apparatus according to an exemplary embodiment is embodied as a wrist band-type wearable device.

FIG. 14 shows an example in which the biometrics authentication apparatus 10 according to an exemplary embodiment is realized as a wrist band-type wearable device.

Referring to FIG. 14, when the user properly wears the biometrics authentication apparatus 10, the light source 1 and the detector 6 of the biometrics authentication apparatus 10 may be placed on a band 30 corresponding to a portion where the pattern of the vein of the wrist is located. When the illumination light 2 is emitted from the light source 1 on the pattern of the vein of the wrist, the spatial distribution of the detection light 4 that is scattered and propagated by the pattern of the vein is changed by the modulator 5 according to the sequence control, a signal that is obtained by detecting integral power from the detector 6 is processed to obtain a measurement signal, and a determination as to whether to authenticate the user may be made according to a degree of match between the measurement signal and the reference signal, for example, the correlation value.

Figure 15:
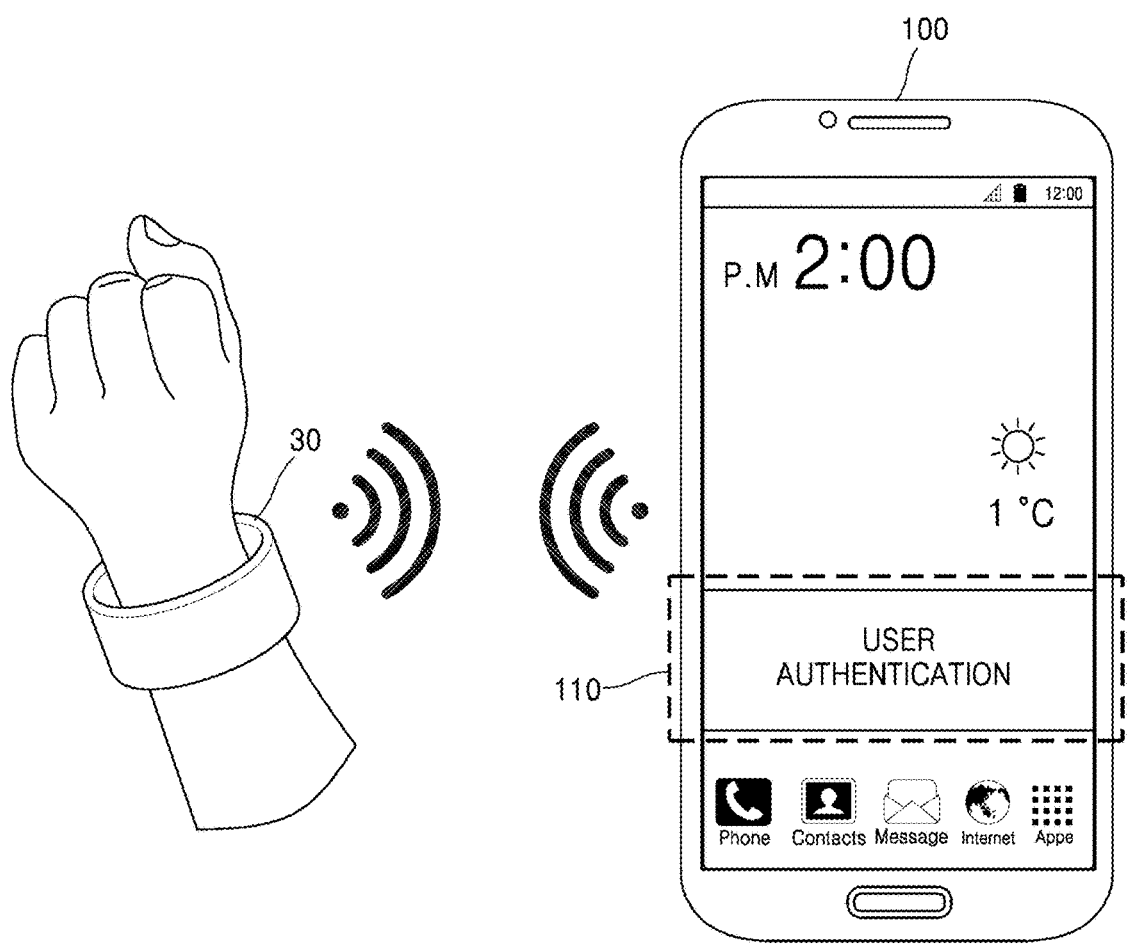
FIG. 15 is a referential diagram for explaining a method of providing, by a biometrics authentication apparatus, user authentication information when the biometrics authentication apparatus is embodied as a wrist band-type wearable device as in FIG. 14.

FIG. 15 is a referential diagram for explaining a method of providing, by the biometrics authentication apparatus 10, user authentication information when the biometrics authentication apparatus 10 is realized as a wrist band-type wearable device as in FIG. 14.

Referring to FIG. 15, the biometrics authentication apparatus 10 may have a wireless communication function using Bluetooth, Wi-Fi, or the like and may transmit user authentication information to a smart phone 100, or the like of the user. Accordingly, the user may check whether user authentication is successfully performed via a display screen 110 of the smart phone 100, or the like.

According to a biometrics authentication method and a biometrics authentication apparatus according to an exemplary embodiment, a spatial distribution of a detection light that is scattered and reflected from a region of interest of a human body, for example, a body part including a pattern of a vein, is changed by a modulator. A signal that is obtained by detecting an integral power of the detection light is processed to obtain a measurement signal, and by comparing the measurement signal with a reference signal stored in a memory, whether to authenticate a user is determined according to a degree of match between the measurement signal and the reference signal.

Therefore, according to a biometrics authentication method and a biometrics authentication apparatus using the pattern of the vein, user authentication may be stably performed without registering an image showing the pattern of the vein.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A biometrics authentication apparatus comprising:
   a light source configured to emit a light;
   a modulator comprising a liquid crystal display (LCD) comprising a plurality of black pixels and a plurality of white pixels, and configured to control the plurality of black pixels and the plurality of white pixels of the LCD to sequentially form a plurality of two-dimensional (2D) masks at temporal intervals, and change a spatial distribution of the light that is scattered and reflected from a region of interest of a user, via the plurality of 2D masks;
   a detector configured to detect an integral power of the light that passes through each of the plurality of 2D masks of the modulator; and
   a processor configured to obtain a measurement signal based on the integral power of the light, compare the measurement signal with a reference signal stored in a memory, and determine whether to authenticate the user based on a degree of match between the measurement signal and the reference signal, without using an actual image of the region of interest of the user.

2. The biometrics authentication apparatus of claim 1, wherein the processor is further configured to determine whether to authenticate the user based on a correlation value used to determine the degree of match between the measurement signal and the reference signal.

3. The biometrics authentication apparatus of claim 2, wherein the processor is further configured to determine that the user has been authenticated when a correlation value between the measurement signal and the reference signal is greater than or equal to 0.95.

4. The biometrics authentication apparatus of claim 1, wherein the degree of match is represented by a correlation value between the measurement signal and the reference signal, and
   the processor is further configured to perform an authentication process until the correlation value becomes greater than or equal to a predetermined value by repeating a shift of the plurality of 2D binary masks of the modulator to correct misalignment of the biometrics authentication apparatus.

5. The biometrics authentication apparatus of claim 4, wherein the predetermined value is greater than or equal to 0.95.

6. The biometrics authentication apparatus of claim 4, wherein the processor is further configured to obtain a matrix comprising the correlation value by repeating the shift of the plurality of 2D binary masks along at least one of an x axis and a y axis of the LCD.

7. The biometrics authentication apparatus of claim 1, wherein the light emitted from the light source comprises near infrared light having a wavelength ranging from about 750 nm to about 950 nm.

8. The biometrics authentication apparatus of claim 1, wherein the biometrics authentication apparatus comprises a wearable device configured to be worn on a wrist of the user.

9. A biometrics authentication method comprising:
   emitting a light onto a region of interest of a user;
   controlling a plurality of black pixels and a plurality of white pixels of a liquid crystal display (LCD) to sequentially form a plurality of two-dimensional (2D) masks at temporal intervals;
   changing a spatial distribution of the light that is scattered from the region of interest, via the plurality of 2D masks;
   detecting an integral power of the light that passes through each of the plurality of 2D masks;
   obtaining a measurement signal based on the integral power of the light;
   comparing the measurement signal with a reference signal; and
   determining whether to authenticate the user based on a degree of match between the measurement signal and the reference signal, without using an actual image of the region of interest of the user.

10. The biometrics authentication method of claim 9, wherein the determining whether to authenticate the user comprises determining whether to authenticate the user based on a correlation value used to determine the degree of match between the measurement signal and the reference signal.

11. The biometrics authentication method of claim 10, wherein the determining whether to authenticate the user comprises determining that the user has been authenticated when the correlation value is greater than equal to 0.95.

12. The biometrics authentication method of claim 9, wherein the degree of match is represented by a correlation value between the measurement signal and the reference signal, and
   the method further comprises, while a shift of the plurality of 2D binary masks is repeatedly performed, performing an authentication process until the correlation value becomes greater than or equal to a predetermined value to correct misalignment of a biometrics authentication apparatus that performs the biometrics authentication method.

13. The biometrics authentication method of claim 12, wherein the predetermined value is greater than or equal to 0.95.

14. The biometrics authentication method of claim 12, wherein the performing the authentication process comprises obtaining a matrix comprising the correlation value while the shift of the plurality of 2D binary masks is repeatedly performed along at least one of an x axis and a y axis of the LCD.

15. The biometrics authentication method of claim 9, wherein the emitted light comprise near infrared light having a wavelength ranging from about 750 nm to about 950 nm.

* * * * *